United States Patent
El-Beltagy et al.

(10) Patent No.: US 9,258,341 B2
(45) Date of Patent: Feb. 9, 2016

(54) METHOD AND DEVICE FOR CENTRALIZED PEER ARRANGEMENT IN P2P OVERLAY NETWORKS

(71) Applicant: Hive Streaming AB, Stockholm (SE)

(72) Inventors: Mohammed El-Beltagy, Stockholm (SE); Fouad Essayadi, Stockholm (SE); Amgad Naiem, Stockholm (SE)

(73) Assignee: HIVE STREAMING AB, Stockholm (SE)

( * ) Notice: Subject to any disclaimer, the term of this patent is extended or adjusted under 35 U.S.C. 154(b) by 356 days.

(21) Appl. No.: 13/870,790

(22) Filed: Apr. 25, 2013

(65) Prior Publication Data

US 2014/0325086 A1 Oct. 30, 2014

(51) Int. Cl.
| | |
|---|---|
| *G06F 15/16* | (2006.01) |
| *H04L 29/06* | (2006.01) |
| *H04L 29/08* | (2006.01) |
| *G06F 15/177* | (2006.01) |
| *G06F 15/173* | (2006.01) |

(52) U.S. Cl.
CPC ........ *H04L 65/4053* (2013.01); *H04L 65/4076* (2013.01); *H04L 65/4084* (2013.01); *H04L 67/104* (2013.01); *H04L 67/1097* (2013.01)

(58) Field of Classification Search
CPC .............. H04L 67/1089; H04L 67/104; H04L 67/1046; H04L 67/1085; H04L 67/1059
USPC .................................. 709/205, 221, 226, 231
See application file for complete search history.

(56) References Cited

U.S. PATENT DOCUMENTS

| | | | |
|---|---|---|---|
| 2009/0100128 A1* | 4/2009 | Czechowski, III .... | H04L 67/104 709/203 |
| 2009/0182815 A1* | 7/2009 | Czechowski, III .... | H04L 67/104 709/206 |
| 2012/0210014 A1 | 8/2012 | El-Beltagy | |
| 2013/0086278 A1* | 4/2013 | Schmidt .............. | H04L 41/5009 709/231 |
| 2014/0244763 A1* | 8/2014 | Su ....................... | H04L 67/1057 709/205 |

OTHER PUBLICATIONS

Roberto Roverso et al., "Peer2View a Peer-To-Peer HTTP-Live Streaming platform", IEEE P2P 2012 Proceedings, © 2012 IEEE.*
Roberto Roverso et al., "On the Feasibility of Centrally-Coordinated Peer-To-Peer Live Streaming", Consumer Communications and Networking Conference (CCNC), © 2011 IEEE.*

(Continued)

*Primary Examiner* — David Lazaro
*Assistant Examiner* — Vitali Korobov
(74) *Attorney, Agent, or Firm* — Volpe and Koenig, P.C.

(57) ABSTRACT

A method and device for arranging a plurality of peers at distribution levels in a P2P network with respect to a streaming source are described. At least one peer of the plurality of peers having a highest upload capacity may be arranged at the distribution level closest to the streaming source. Remaining peers of the plurality of peers may be arranged at subsequent distribution levels in order of descending upload capacity, such that each peer has an upload capacity that does not exceed the upload capacity of any peer at an immediately preceding level. The peers may be further arranged such that the total upload capacity of the peers at any distribution level is equal to or exceeds total download demand of the peers at an immediately subsequent level. If a predetermined maximal allowed number of distribution levels has been exceeded, one or more peers may be moved or re-arranged.

26 Claims, 13 Drawing Sheets

(56) References Cited

OTHER PUBLICATIONS

International Search Report with Written Opinion, International Appln. No. PCT/EP2014/057381, May 30, 2014, 11 pp.

Tara Small et al: "Scaling Laws and Tradeoffs in Peer-to-Peer Live Multimedia Streaming", ACM Multimedia 2006 & Co-Located Workshops: Oct. 23-27, 2006, Santa Barbara, California, U.S.; MM '06; Proceedings, ACM Press, [New York, NY], Jan. 2, 2006, pp. 539-548.

* cited by examiner

METHOD AND DEVICE FOR CENTRALIZED PEER ARRANGEMENT IN P2P OVERLAY NETWORKS

TECHNICAL FIELD

The invention relates to a method of, and a device for, arranging peers in a P2P network with respect to a streaming source.

BACKGROUND

For live video streaming in a client-server approach, the video stream is downloaded from the streaming server (i.e. the source of content to be streamed) to the client. A video stream consists of a set of consecutive data pieces, or data subset, that the client periodically requests in order to play the video. A scalable live streaming service requires high streaming server bandwidth to satisfy an increasing number of clients over the internet. In order to reduce the cost of the streaming server, Peer-to-peer (P2P) live streaming has been developed. The basic concept of P2P live streaming is to make the clients, referred to as peers in this context, share the load with the streaming server.

P2P live streaming systems has gained a lot of interest in the recent years as it has the advantage of allowing a streaming source to broadcast e.g. a live video event to a large number of peers, without having to provide all the required bandwidth. This is done by making use of the peers' upload capacity to assist the streaming source in broadcasting the content to the peers.

P2P networks comprise any networks composed of entities that each provides access to a portion of their resources (e.g., processing capacity, disk storage, and/or bandwidth) to other entities. The P2P concept differs from traditional client/server architecture based networks where one or more entities (e.g., computers) are dedicated to serving the others in the network. Typically, entities in a P2P network run similar networking protocols and software. Applications for P2P networks are numerous and may for example comprise transporting and/or storing data on the Internet, such as video distribution for content owners.

Many approaches have been developed to efficiently make use of the upload capacity of the peers. These approaches can be divided into two main categories.

Tree-based systems are based on constructing one or more structured trees in an overlay network where peers at the top of each tree feed the peers below them. This approach works well when the peers do not join or leave the system at high frequency as data flow is achieved without any further messages between the peers. However, in a high churn environment, tree maintenance can be very costly and sometimes destruction and reconstruction of the tree(s) are necessary.

Mesh-based systems do not enforce a tree construction, or in other words peer connectivity does not form a specified overlay, and they are connected to each other in an unstructured manner. They exchange data through so called gossip communication or by sending data request messages to each other. A disadvantage with mesh-based systems is that they can have a long setup time, as nodes need to negotiate with each other to find peers. However, many systems use the mesh-based approach as it is very robust to high chrn. In such systems each peer has a number of neighbours that it potentially downloads from and failure of any neighbor is thus not as critical as in tree-based approaches.

Although individual peers take decisions locally without a global view in the mesh-based approaches, they can still reach comparable savings to tree based approaches when peer churn is considered, mainly since they do not have to carry the heavy overhead of maintaining a view of the global connectivity structure.

In a decentralized P2P live streaming network, each peer has k neighbouring peers form which it can attempt to download data content. Thus, the peer will try to find a neighbouring peer that it can download from instead of downloading the data content from the streaming server. Given such a prior art overlay network, if the peers start streaming data content from the same point in time, all the peers will not find an uploading peer that has useful content. Hence, almost all the peers will download from the streaming server, which ultimately leads to minimal savings in streaming server bandwidth utilization.

SUMMARY

An object of the present invention is to solve or at least mitigate these problems in the art of how to increase streaming server savings in P2P live streaming networks.

This object is attained in a first aspect of the present invention by a method of arranging a plurality of peers at distribution levels in a P2P network with respect to a streaming source. The method comprises arranging at least one peer of the plurality of peers having a highest upload capacity at the distribution level closest to the streaming source. Further, the method comprises arranging remaining peers of the plurality of peers at subsequent distribution levels in order of descending upload capacity, such that each peer has an upload capacity that does not exceed the upload capacity of any peer at an immediately preceding level, the peers further being arranged such that the total upload capacity of the peers at any distribution level is equal to or exceeds total download demand of the peers at an immediately subsequent level. Moreover, the method comprises, if a predetermined maximal allowed number of distribution levels has been exceeded, moving at least one of the peers having a next-highest upload capacity to the distribution level closest to the streaming source and connecting a plurality of peers from subsequent levels to said at least one of the peers having a next-highest upload capacity such that the next-highest upload capacity is fully utilized. Finally, the method comprises re-arranging at least one selected peer arranged at a level subsequent to that closest to the streaming source and connecting the at least one selected peer to said at least one peer having the highest upload capacity such that the highest upload capacity is fully utilized, until the predetermined maximum number of distribution levels no longer is exceeded.

This object is attained in a second aspect of the present invention by a device for arranging a plurality of peers at distribution levels in a P2P network with respect to a streaming source. The device comprises a processing unit being configured to arrange at least one peer of the plurality of peers having a highest upload capacity at the distribution level closest to the streaming source, and arrange remaining peers of the plurality of peers at subsequent distribution levels in order of descending upload capacity, such that each peer has an upload capacity that does not exceed the upload capacity of any peer at an immediately preceding level (from which it downloads data content), the peers further being arranged such that the total upload capacity of the peers at any distribution level is equal to or exceeds total download demand of the peers at an immediately subsequent level. The processing unit is further configured to, if a predetermined maximal allowed number of distribution levels has been exceeded, move at least one of the peers having a next-highest upload capacity to the distribution level closest to the streaming source and connecting a plurality of peers from subsequent levels to said at least one of the peers having a next-highest upload capacity such that the next-highest upload capacity is fully utilized, and further to re-arrange at least one selected peer arranged at a level subsequent to that closest to the streaming source and connecting the at least one selected peer to said at least one peer having the highest upload capacity such that the highest upload capacity is fully utilized, until the predetermined maximum number of distribution levels no longer is exceeded.

Advantageously, a peer having the highest upload capacity is initially arranged at the distribution level closest to the streaming source for making efficient use of peer bandwidth/upload capacity and consuming the smallest possible bandwidth of the streaming source. Thereafter, the remaining peers are arranged at subsequent distribution levels in order of descending upload capacity such that each peer has an upload capacity that do not exceed the upload capacity of a peer at an immediately preceding level in order to always maintain efficient use of the respective peer's upload capacity. Further, the peers are arranged such that the total upload capacity of the peers at any distribution level is equal to or exceeds total download demand of the peers at an immediately subsequent level, in order to avoid a situation where the peers at a particular distribution level is exhausted while download demand of the peers at the immediately subsequent level is not satisfied. By setting a maximal number of distribution levels to be allowed in the network, the average number of hops from the streaming server to downstream peers is reduced, which directly translates into smaller playback delays. This is highly advantageous in a P2P network. If after this first iteration of arranging peers the maximal allowed number of distribution levels in the network is exceeded, a second iteration is undertaken.

Thus, a next-highest upload capacity peer is moved to the first distribution level where the highest upload capacity peer initially was placed, possibly while maintaining the connection to its downstream peers to which it uploads data content. It should be noted that this maintaining of connections is not strictly required, but may be desirable given that necessary conditions for arranging the peers are satisfied. Moreover, at least one selected peer (but in practice a number of peers) at a level subsequent to the first level is re-arranged and connected to the peer having the highest upload capacity such that the full upload capacity of the highest-capacity peer is utilized. This is repeated in further iterations until the maximal number of distribution levels to be allowed in the network is not exceeded. By continuously moving and re-arranging the peers in this manner, the constructed tree will fully utilize all the available peer upload bandwidth.

Moreover, with the highly structured way of creating a P2P network as proposed by the present invention, it is easier to accommodate new peers in the P2P network. In the art, a P2P overlay network must be repeatedly torn down such that new peers can be accommodated, whereas in the present invention, overlay maintenance is done periodically and in practice, the overlay network is rebuilt from the top levels, i.e. those closest to the streaming source, while peers are added to the lower layers while system constraints are preserved. Again, by continuously moving and re-arranging the peers in this manner, the constructed tree will fully accommodate additional peers.

Embodiments of the present invention are defined by the dependent claims.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which:

FIGS. 1a and b show a prior art P2P overlay network with peers connected to a streaming source, where FIG. 1a illustrates random arrangement of peers in the network and FIG. 1b illustrates a more effective approach of arranging the peers;

FIGS. 2a and b illustrate a prior art P2P overlay network, where FIG. 2a illustrates underutilization of peer bandwidth and FIG. 2b illustrates a more effective arrangement;

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
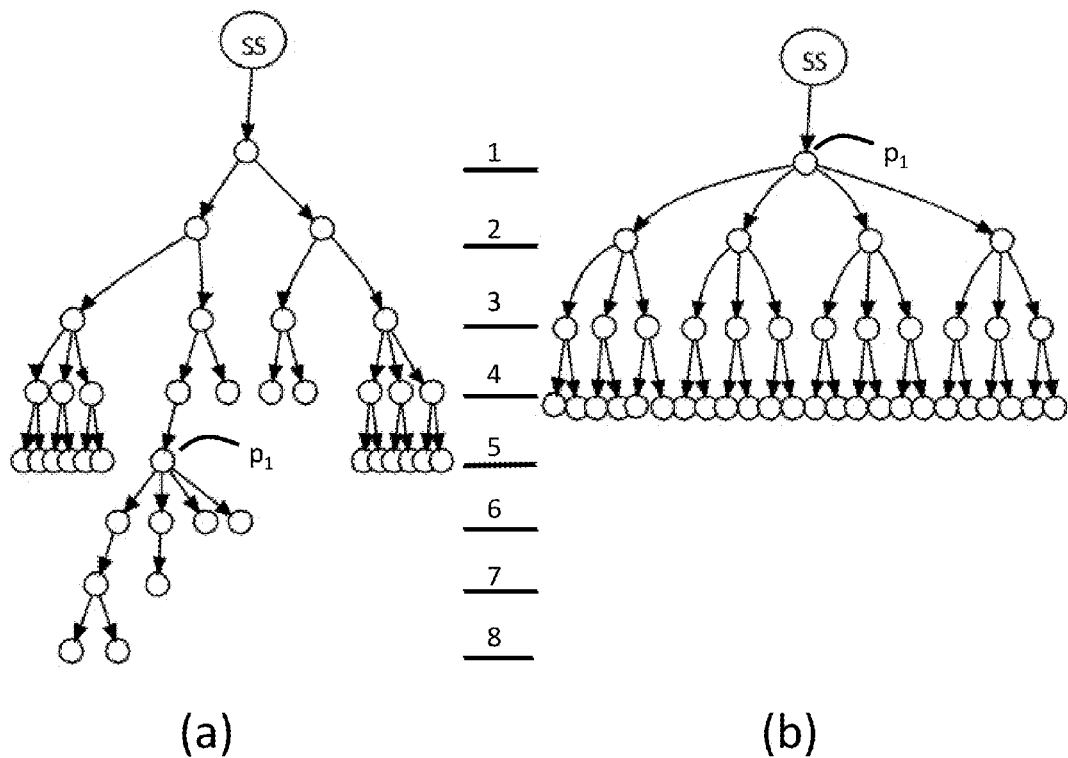

FIGS. 1a and b show a prior art P2P overlay network with peers (in practice peer devices such as television sets, mobile phones, computers, etc.) connected to a streaming source in the form of a streaming server SS that distributes data content in the form of data streams to the network peers arranged in distribution layers/levels in relation to the streaming source; FIG. 1a shows that one peer is arranged at level one, i.e. the level closest to streaming source SS, two peers are arranged at level two, four peers are arranged at the third level, and so on. Thus, the peer at the first level distributes data content to the two peers at the second level, while those two peers streams the data content to another four peers, etc. In such a prior art P2P live streaming network, each peer entering the network will ask a central coordinator referred to as a tracker (not shown) for the required content data, and the tracker will instruct the requesting peer to which neighbouring peer it should connect. The tracker may provide the requesting peer with a list of k peers from which the requesting peer potentially can download the requested data content. The further away from the streaming source a peer is arranged, the greater delay the uploading peer will experience when rendering the streamed data content with respect to a real-time playback point of the data content distributed by the streaming source. It may thus be desirable to reduce the number of levels, i.e. maximal hop count, to reduce playback delays in the network.

FIG. 1a illustrates an example of an inefficient P2P network arrangement where the peers are placed randomly in the network resulting in eight distribution levels. As can be seen, peer $p_1$ at the fifth level has the greatest upload capacity and is capable of uploading data content to another four peers.

FIG. 1b illustrates an alternative and more efficient approach of arranging the peers with respect to reducing playback delay. For instance, peers with a higher upload capacity is placed closer to the streaming source SS. In this example, the highest-capacity peer $p_1$ is placed at the first level. By using such an approach, the number of levels in the network can be generally be reduced, resulting in smaller playback delays.

Figure 2:
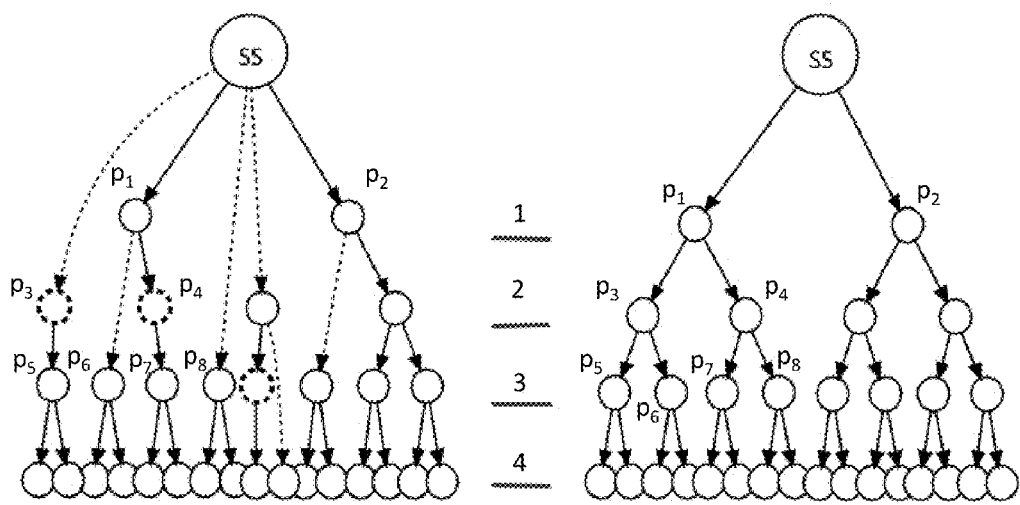

FIGS. 2a and b illustrate another important aspect to consider in a P2P network. In a non-elaborate arrangement approaches, may peers are placed in the network such that their upload capacity is unutilized which has as a result that downloading peers may be forced to resort to the streaming source for requested data content. A perfect tree is one in which all peers from row i will have their ancestors at levels not greater than i and not lower than i-1. FIG. 2a shows the effect of underutilized peers (indicated with dotted circles). Such underutilization would leave some peers no choice but to connect to the streaming source SS. As compared to a traditional client-server network, where the server distributes content to all clients in the network, savings in streaming server load of the P2P network in FIG. 2a is 25/30=0.83. That is, instead of streaming content to all 30 peers, the streaming source SS streams content to five of the peers, which in their turn unload the streaming source by streaming content to the remaining 25 peers, at the expense of network latency.

FIG. 2b shows an arrangement where the tracker (not shown) arranges the peers in distribution levels such that the total capacity of any level is at least equal to the bandwidth required by the peers at the next level, resulting in better utilization of the peer's upload capacity. For instance, instead of having peer $p_3$ download from the streaming source, it now downloads from peer $p_1$. Further, peer $p_3$ uploads to both peers $p_5$ and $p_6$, whereas peer $p_4$ uploads to both peers $p_7$ and $p_8$, and so on, relieving the streaming source SS to upload to peer $p_8$. In the P2P network of FIG. 2b, streaming source load savings can be further increased to 28/30=0.93.

Figure 3:
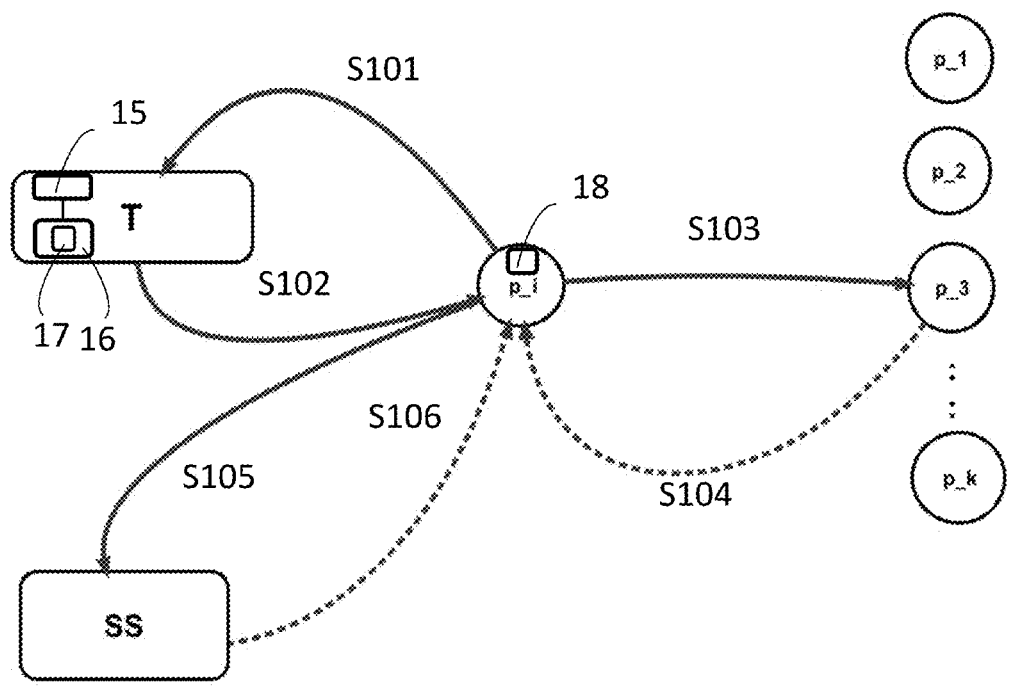
FIG. 3 shows a P2P network in which embodiments of the present invention could be implemented.

FIG. 3 shows a P2P network in which embodiments of the present invention could be implemented, where continuous lines denote request/reply messages, while dashed lines denote streaming channels. A new peer $p_1$ enters the network and requests the tracker T in step S101 to receive data content originally streamed from the streaming source SS. The tracker T determines the level at which the entering peer $p_1$ is to be arranged and provides in step S102 the entering peer with a list of randomly selected peers from which the data content can be downloaded. Thus, the entering peer requests in step S103 one of the peers on the list to supply it with the desired content. If there exists at least one peer of the randomly selected peers which is arranged at a level closer to the streaming source than that determined for the entering peer, the requested data content will be uploaded in step S104 to the entering peer with some given probability. In FIG. 3, peer $p_3$ uploads the requested data content to the entering peer $p_1$. Depending on how the level for the entering peer is selected, the probability that a peer can upload the requested data content to the entering peer in step S104 can be increased. If no randomly selected peer exists which is located at a level closer to the source than that determined for the entering peer, i.e. all peers are arranged at a level which is equal to or further downstream of the level that is determined for the entering peer, the requested data content will not be uploaded in step S104 to the entering peer. In that case, the entering peer will in step S105 turn to the streaming server SS for the requested data content, which in its turn will upload the requested data content to the entering peer in step S106. Analogously, depending on how the level for the entering peer is selected, the probability that the streaming server SS will have to upload the requested data content to the entering peer in step S106 can be decreased.

The tracker determines the delay $d_i$ with which an entering peer is to receive the content data with respect to a real-time playback point of the data content uploaded by the streaming source SS on the basis of statistical information. This delay $d_i$ translates to a particular distribution level in the network. The behaviour of a P2P network in which the present invention is implemented is stochastic, which is based on currently streaming network peers. Thus, statistical information should be considered such that a probability distribution that represents the behavior of peers in the P2P live streaming network can be formed. Given the probability distribution p(d) of the distribution levels of the peers with respect to the streaming server, expected savings in the streaming server bandwidth load can be calculated. Thus, by setting a level which follows the distribution p(d) for each entering peer, the savings of the stream server will approach the expected savings calculated using the distribution. Or to put it in another way: by determining an appropriate level at which the entering peer is to be arranged in the network, the probability that a network peer can be found from which the entering peer can download requested data content can be increased. Thus, the savings in the streaming server bandwidth is directly related to the probability that a network peer can upload requested data content to the entering peer.

With reference to FIG. 3, the tracker T for performing the method of arranging peers in a P2P network according to embodiments of the present invention, as well as the peer device $p_i$ according to embodiments of the invention, are typically equipped with one or more processing units 15 embodied in the form of one or more microprocessors arranged to execute a computer program 17 downloaded to a suitable storage medium 16 associated with the microprocessor, such as a Random Access Memory (RAM), a Flash memory or a hard disk drive. The processing unit 15 is arranged to at least partly carry out the method according to embodiments of the present invention when the appropriate computer program 17 comprising computer-executable instructions is downloaded to the storage medium 16 and executed by the processing unit 15. The storage medium 16 may also be a computer program product comprising the computer program 17. Alternatively, the computer program 17 may be transferred to the storage medium 16 by means of a suitable computer program product, such as a compact disc or a memory stick. As a further alternative, the computer program 17 may be downloaded to the storage medium 16 over a network. The processing unit 15 may alternatively be embodied in the form of an application specific integrated circuit (ASIC), a field-programmable gate array (FPGA), a complex programmable logic device (CPLD), etc.

Figure 4:
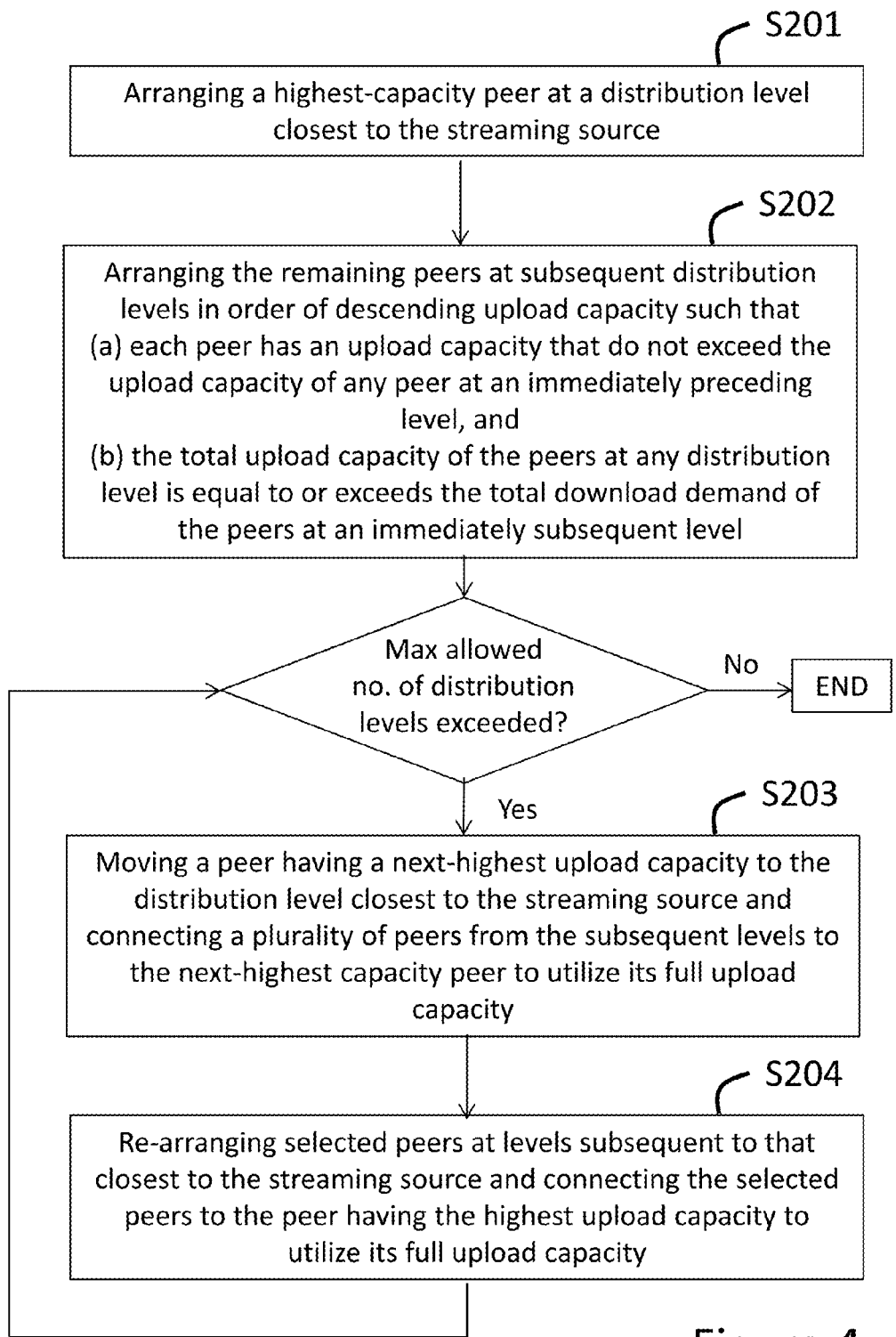
FIG. 4 shows a flowchart illustrating the method of arranging a plurality of peers at distribution levels in a P2P network with respect to a streaming source, according to an embodiment of the present invention.

FIG. 4 shows a flowchart illustrating the method of arranging a plurality of peers at distribution levels in a P2P network with respect to a streaming source, according to an embodiment of the present invention. In a first step S201, at least one of the peers having a highest upload capacity is arranged at the distribution level closest to the streaming source. Thereafter, in step S202, the remaining peers are arranged at subsequent distribution levels in order of descending upload capacity such that each peer has an upload capacity that do not exceed the upload capacity of any peer at an immediately preceding level. However, a peer at a particular level may have the same upload capacity as the peer at the immediately preceding level from which it uploads data. For reasons of effective bandwidth utilization, a first peer having a greater upload capacity than a second peer should not be placed downstream of the second lower-capacity peer. In step S202, the remaining peers are further arranged such that the total upload capacity of the peers at any distribution level is equal to or exceeds total download demand of the peers at an immediately subsequent level.

Now, when arranging the peers in the P2P network according to the embodiments of the present invention, a maximal number of distribution levels allowed in the network is set in order to ensure an upper limit for peer playback delay. If after a first iteration of arranging the peers in the network this maximal allowed number of distribution levels is exceeded and peers are placed at a distribution level higher than maximal allowed, the tracker moves on to step S203. In step S203, at least one of the peers having a next-highest upload capacity is moved to the distribution level closest to the streaming source and further a plurality of peers from the subsequent levels is connected to the next-highest capacity peer in order to fully utilize its upload capacity. It should be noted that the next-highest capacity peer may have the same upload capacity as the previously mentioned highest-capacity peer that initially was placed in at the level closest to the streaming source. When initially arranging a highest-capacity peer at the most upstream level, the plurality of peers to be arranged may comprise a number of highest-capacity peers having the same upload capacity, meaning that at least one highest capacity peer is picked and placed at the first level while one or more peers having the same highest capacity may be placed at the second level (and so on). Moreover, in step S204, at least one selected peer at a level subsequent to that closest to the streaming source is re-arranged and connected to the peer having the highest upload capacity such that the full upload capacity of the peer having the highest upload capacity is utilized. This step is repeated until the predetermined maximum number of distribution levels no longer is exceeded. As further peers are added to the P2P network, steps S203 and S204 are continuously repeated.

Figure 5:
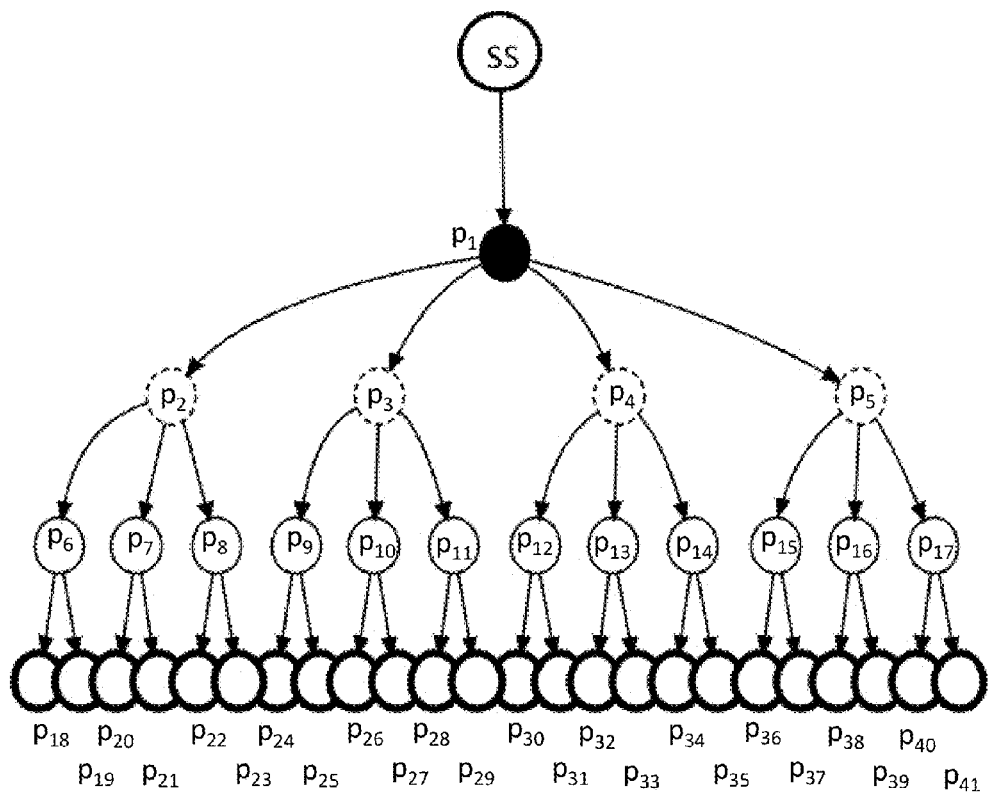
FIG. 5 illustrates a first iteration of the method of arranging peers in a P2P network according to the embodiment of the present invention shown in FIG. 4.
Figure 5:
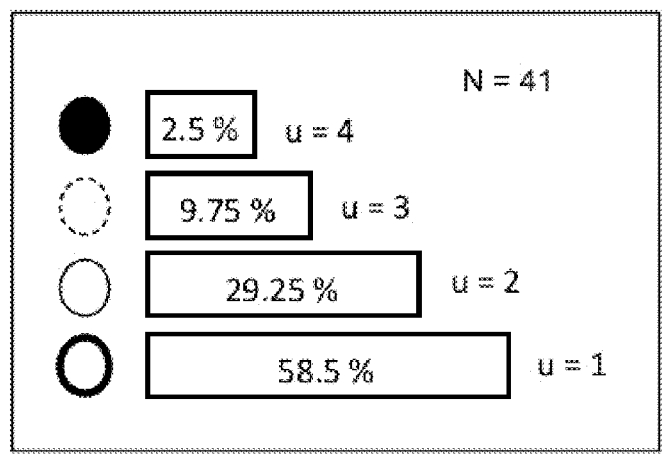

The method of arranging peers according to the embodiment of the present invention illustrated in FIG. 4 will be discussed in more detail with reference made to FIGS. 5-8. In this particular exemplifying embodiment, 41 peers are arranged in a P2P network. The upload capacity of the peers is denoted u. In this context, u is defined as the number of simultaneous uploads per peer and is determined by bandwidth distribution $p_{bw}$ and the streaming bitrate br. The number of simultaneous uploads per peer is thus calculated as $u=p_{bw}/br$. As an example, if a given peer is assigned, a bandwidth of 1 Mb/s and the streaming bit rate is 200 kB/s, the peer can simultaneously upload to five other peers. With reference to FIG. 5, one peer $p_1$ is capable of uploading to another four peers (u=4), four peers $p_2$-$p_5$ have an upload capacity of u=3, twelve peers $p_6$-$p_{17}$ is capable of each uploading to another two peers (u=2), and finally 24 peers $p_{18}$-$p_{41}$ can seat a single peer (u=1). In the exemplifying embodiment of FIGS. 5-8, the maximal allowed number of distribution levels, $m_{row}$ is three.

Hence, in a first step, the peer $p_1$ having the highest upload capacity, u=4, is arranged at the distribution level closest to the streaming source SS. Thereafter, the remaining peers are arranged at subsequent distribution levels in order of descending upload capacity such that each peer has an upload capacity that do not exceed the upload capacity of a peer at an immediately preceding level. Thus, the four peers $p_2$-$p_5$ having u=3 are arranged downstream from the highest-capacity peer $p_1$, but upstream from the twelve peers $p_6$-$p_{17}$ having u=2, etc.

Further, the peers are arranged such that the total upload capacity of the peers at any distribution level is equal to or exceeds total download demand of the peers at an immediately subsequently level. For instance, the total download demand of the peers $p_{18}$-$p_{41}$ at the fourth distribution level should not exceed the upload capacity of the peers $p_6$-$p_{17}$ at the third level. Additionally, to maintain optimal savings, the upload capacity of any peer at any given distribution level should not be lower than that of a peer at a subsequent level, as previously has been discussed. As can be seen in FIG. 5, the maximal number of distribution levels allowed in the network $m_{row}$=3, is exceeded.

Figure 6:
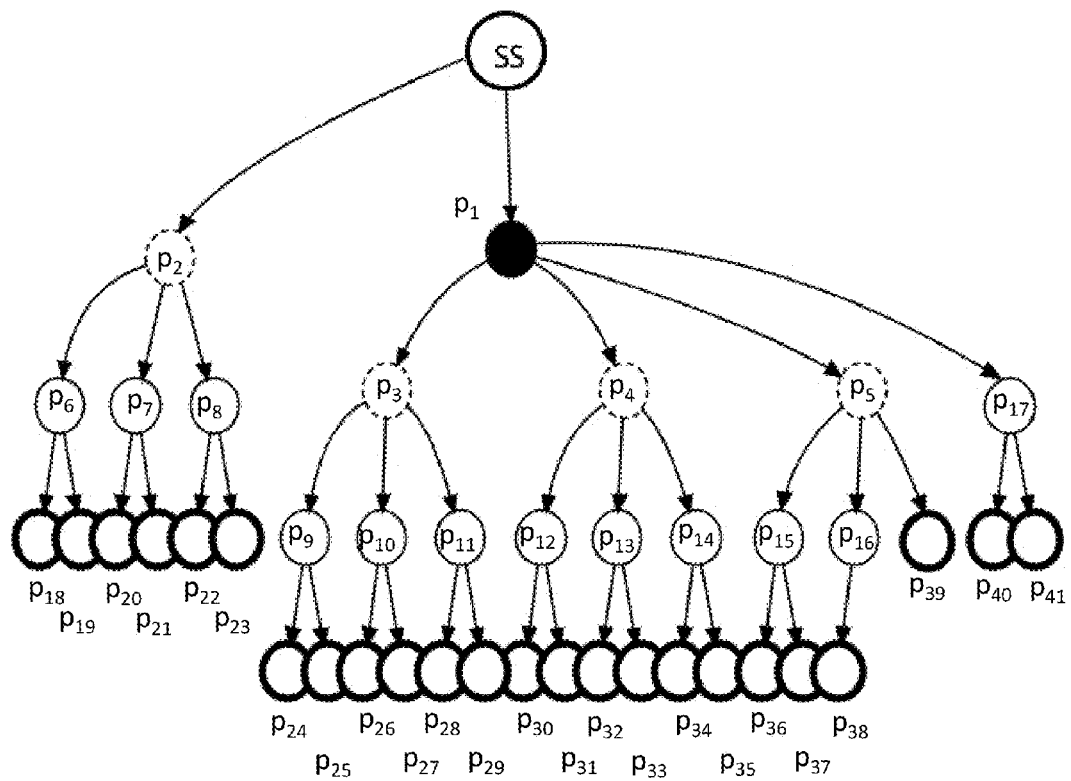
FIG. 6 illustrates a second iteration of the method of arranging peers in a P2P network according to the embodiment of the present invention shown in FIG. 4.

Thus, with reference to FIG. 6, a second iteration is undertaken in that a next-highest upload capacity peer $p_2$ is moved to the first level where the highest-upload capacity peer $p_1$, initially as placed while the connection to the peers $p_6$-$p_8$ (and indirectly to the peers $p_{18}$-$p_{23}$) to which the next-highest capacity peer $p_2$ uploads data content at the subsequent levels is maintained. It should be noted that this maintaining of connections is not strictly required, but may be desirable given that the other conditions for arranging the peers are satisfied. Moreover, at least one selected peer $p_{17}$ at a level subsequent to that closest to the streaming source SS is re-arranged and connected to the peer $p_1$ having the highest upload capacity such that the full upload capacity (u=4) of the peer $p_1$ is utilized while the peers $p_{17}$ connection to the peers $p_{40}$, $p_{41}$ is maintained. Further the peer $p_{39}$ is moved upstream to connect to the peer $p_5$. Since the maximum number of allowed levels still is exceeded, a third iteration is undertaken.

Figure 7:
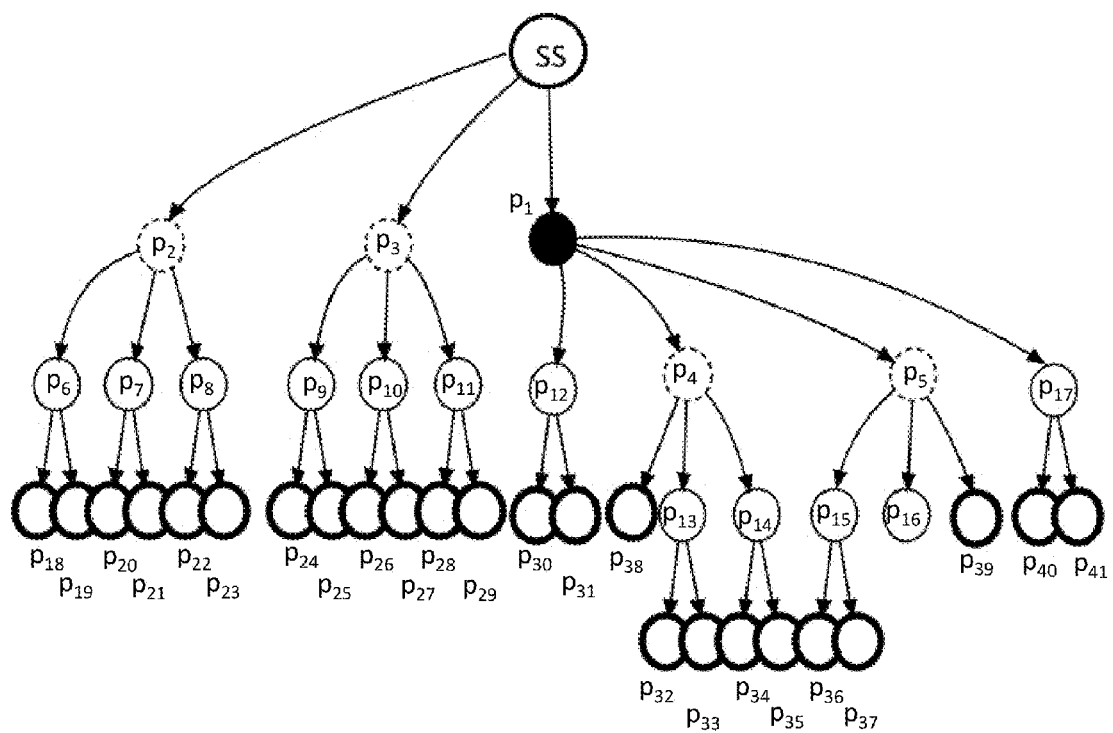
FIG. 7 illustrates a third iteration of the method of arranging peers in a P2P network according to the embodiment of the present invention shown in FIG. 4.

With reference to FIG. 7, a next-highest upload capacity peer $p_3$ is thus moved to the first level where the highest-upload capacity peer $p_2$ initially was placed, while the connection to the peers $p_9$-$p_{11}$ is (and indirectly to the peers $p_{24}$-$p_{29}$) to which the next-highest capacity peer $p_3$ uploads data content at the subsequent levels is maintained (again not strictly necessary). Moreover, at least on selected peer $p_{12}$ at a level subsequent to that closest to the streaming source SS is re-arranged and connected to the peer $p_1$ having the highest upload capacity such that the full upload capacity (u=4) of the peer $p_1$ is utilized while the peers $p_{12}$ connection to the peers $p_{30}$, $p_{31}$ is maintained. Further, the peer $p_{38}$ is moved upstream to connect to the peer $p_4$. As the maximum number of allowed levels still is exceeded, a fourth iteration is undertaken.

Figure 8:
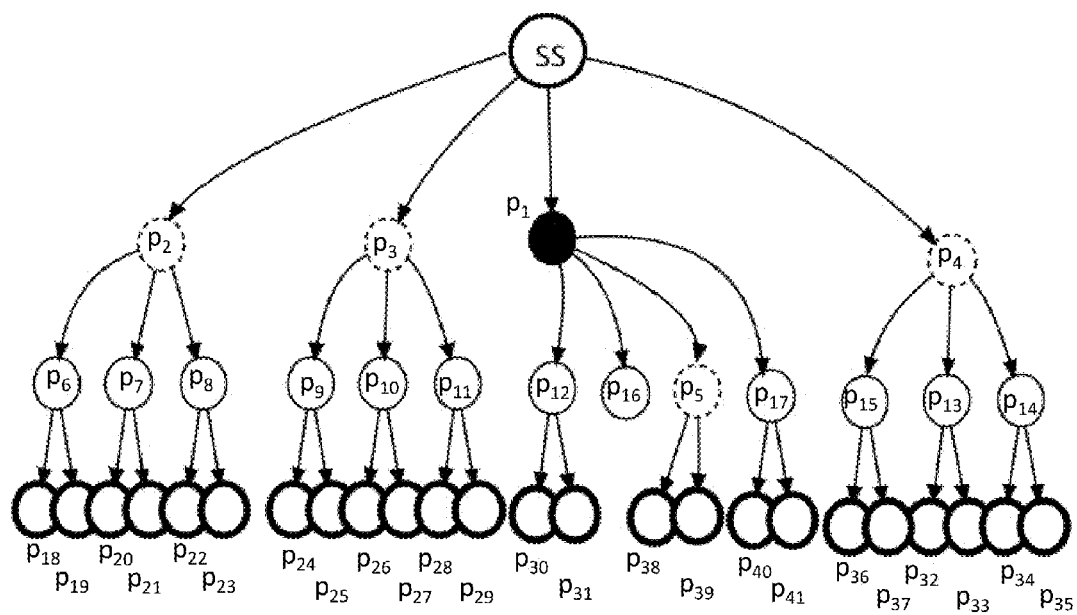
FIG. 8 illustrates a fourth and final iteration of the method of arranging peers in a P2P network according to the embodiment of the present invention shown in FIG. 4.

With reference to FIG. 8, a next-highest upload capacity peer $p_4$ is hence moved to the first level where the highest-upload capacity peer $p_1$ initially was placed. In this case, as can be concluded from FIG. 7, it is not possible to maintain the connection to the peers $p_{13}$, $p_{14}$ and $p_{38}$ to which the next-highest capacity peer $p_3$ uploads data content at the subsequent levels, since the peer $p_{38}$ then would be placed at the second distribution level, while one of the higher-capacity peers $p_{15}$ and $p_{16}$ would remain at the third level (one of them would be moved up to the second level and connected to the highest-capacity peer $p_1$). Thus, since the condition that each peer should have an upload capacity that do not exceed the upload capacity of any peer at an immediately preceding level would not be satisfied, the connection to downstream peers can in this case not be maintained. Consequently, the next-highest upload capacity peer $p_4$ is moved to the first level while maintaining its connection to the peers $p_{13}$ and $p_{14}$ (and indirectly to $p_{32}$-$p_{35}$), but the peer $p_{15}$ (along with its downstream peers $p_{36}$ and $p_{37}$) is moved upstream to the second level and connected to the next-highest upload capacity peer $p_4$ such that the full upload capacity of the peer $p_4$ is utilized. Moreover, at least one selected peer $p_{16}$ at a level subsequent to that closest to the streaming source SS is re-arranged and connected to the peer $p_1$ having the highest upload capacity such that the full upload capacity (u=4) of the peer $p_1$ is utilized. Further, the peer $p_{38}$ (which was disconnected from the next-highest upload capacity peer $p_4$) is moved upstream to connect to the peer $p_5$ but could alternatively have been moved upstream to connect to the peer $p_{16}$. As can be seen in FIG. 8, with this fourth iteration, the maximum number of allowed levels ($m_{row}$=3) is no longer exceeded, and the process terminates. As further peers are added to the P2P network, the process is continuously repeated.

In an embodiment of the present invention, as has been discussed with reference to FIG. 5-8, when moving a next-highest upload capacity peer (exemplified by $p_2$, $p_3$ and $p_4$) upstream to the first level where the highest upload capacity peer $p_1$ initially was placed, it is advantageous to maintain the connection to the peers at the subsequent levels to which said at least one of the peers having a next-highest upload capacity uploads data content, since a batch of peers can be moved upstream in one single action. With reference to e.g. FIG. 6, the connection from the peer $p_2$ to the downstream peers $p_6$, $p_7$ and $p_8$ is maintained (and indirectly the connection to the peers $p_{18}$-$p_{23}$). However, the connections can only be maintained if the condition that a peer placed at any level has an upload capacity that does not exceed the upload capacity of a peer at an immediately preceding level is satisfied. For instance, with reference to FIG. 7, when moving the peer $p_4$ upstream, the connections to the peers $p_{13}$, $p_{14}$ and $p_{38}$ could not be maintained, since this condition was not fulfilled.

In a further embodiment of the present invention, data content in the form of e.g. a video stream id divided into a number of sub-streams or stripes. For instance, instead of having a peer download a given data content from a neighboring peer as one single piece of data, it can download have the content as one sub-stream from a first neighboring peer and the other half of the content as one sub-stream from a second neighboring peer. Such a division of data content into sub-streams has the advantage that the system can become more resilient to failures if the topology is carefully constructed. For instance, a topology could be designed such that a single peer failure only results in the loss of a single stripe amongst its downloading peers. If sub-streams are constructed using schemes that allow for redundancy such as Multiple Descriptor Coded (MDC) and Forward Error Corrections (FEC), the loss of a single stripe will not cause a major disruption in the viewing experience of an end user.

For instance, if the content stream rate is 1 Mbps, and 4 stripes are used to distribute the content, each stripe would constitute a sub-stream of 256 kbps. Given a peer with an upload capacity of 1.5 Mbps which distributes data to six other peers with a maximum upload capacity of 256 kbps, this peer is said to have six "seats" since it can upload six stripes simultaneously to other peers with a predetermined upload bandwidth. Thus, in line with the previously given example of upload capacity, u would in this particular example amount to 6.

The division of bandwidth and seats is made such that a peer arranging device in the P2P overlay network is provided with a simple model of the bandwidth/upload capacities of the peers. In a case where data of an original stream is spread over a number of sub-streams, where none of the sub-streams comprises overlapping data, each peer needs to be downloading all the sub-streams in order to be able to completely reconstruct the original stream. Such a system more effectively exploits the capacity of each and every peer in the network. Further, it advantageously allows a peer to upload a subset of a content stream—i.e., one or more stripes—even if its upload bandwidth is less than the playback streaming rate. Thus, given that the size of a stripe is dimensioned appropriately, the bandwidth of all peers in the network can be utilized; even peers with a small upload bandwidth.

In order to find the optimal (or near-optimal) peer assignment, a mixed integer programming (MIP) model is proposed to accomplish effective assignment of peers in distribution levels. In the model, $m_u$ is defined as the number of upload bandwidth types for the peers in the P2P network and $m_{row}$ as the maximum number of rows allowed in the network. In the exemplifying embodiment described in connection to FIGS. 5-8, $m_u$=4 and $m_{row}$=3. In this model, the value of $m_{row}$ sets the constraints of the user experience quality with respect to playback delay. Given that there are N peers in the network, $N_i$ is defined as the number of peers with upload bandwidth type i and hence $\Sigma_i N_i$ should be equal to N. Each bandwidth type i is associated with an upload capacity $u_i$ expressed in units of sub-streams.

Hence, the MIP problem variable $x_{ij}$ can be defined as the number of peers at distribution level j and upload capacity type i. Further, $x_s$ is defined as the bandwidth required from the streaming server. The primary objective is to minimize the load on the streaming server. A secondary objective is to minimize the total number of rows as much as possible i.e. is it more preferable to put the peers at the upstream levels close to the streaming source than at levels further downstream in the network.

A constraint—i.e. a condition to be fulfilled as previously discussed—is that the total of upload capacity of the peers at any given distribution level must be greater than or equal to the total download demand of the peers arranged at the immediately subsequent level:

$$x_8 \geq h \sum_{i=1}^{m_u} x_{i1}$$

$$\sum_{i=1}^{m_u} u_i x_i (j-1) \geq h \sum_{i=1}^{m_u} x_{ij} \quad \forall\, j \in \{2, \ldots, m_{row}\}$$

A further constraint is that the total number of peers in the P2P network with bandwidth type i across all distribution levels should be equal to the predetermined total number of peers of the same type:

$$\Sigma_{j=1}^{m_{row}} x_{ij} = N_i \; \forall i \in \{1, \ldots, m_u\}$$

In an embodiment of the present invention, in order to compensate for peer failure or churn, a safety factor will be introduced which is the ration of the total upload capacity for the peers of a particular distribution level to the required download demand of the peers at the immediately subsequent distribution level. Thus, the inequality in eq. (1) is modified to include the safety factor. The safety factor $S_f$ is determined based on the excess capacity required between the two distribution levels, i.e. if 20% of excess capacity is desired, then the safety factor would be set to 1.2. Advantageously, there can be a different safety factor for each row j and its value would be $S_f(j)$. Hence, the modified inequality (1) would be:

$$\sum_{i=1}^{m_u} \frac{u_i x_i(j-1)}{S_f(j)} \geq h \sum_{i=1}^{m_u} x_{ij} \ \forall \ j \in \{2, \ldots, m_{row}\}$$

As can be deducted, more bandwidth is allocated at each level than what would be required by peers at the subsequent level. The idea of having a safety factor is that peers can be redirected to available and spare safety factor slots if an uploading peer in at a particular level has failed to provide a requesting peer with data content. This can be done instantly without the need to make any changes in the network tree structure.

As has been shown in the exemplifying embodiment of the method according to the present invention discussed with reference to FIGS. 5-8, peers with higher upload capacity is placed at the upstream levels closer to the streaming source while the number of distribution levels in the P2P network is kept low to reduce playback delay. A maximum number of allowed distribution levels $m_{row}$ should not be exceeded when the peers have been arranged in the P2P network. A heuristic has been developed that works with a list of peers sorted in descending order with respect to their upload capacity. It incrementally adds peers from the list to the first row. After each peer addition, it checks if the resultant peer exceeds the predetermined maximum number of distribution levels $m_{row}$.

In an embodiment of the present invention, instead of adding one peer to the distribution level being closest to the streaming source, any number 2, 3, 4, etc., can be used to speed up the peer arrangement process. Thus, instead of adding (or moving up) a single peer to the first level, 2, 3, 4 or more peers are added/moved for each iteration undertaken if a linear increase is desirable. Further, in case an exponential increase is desired, the number of peers added/moved can e.g. be doubled for each iteration.

In yet a further embodiment, an upper bound on the number of peers at the first level required to stream to all the peers in the network can be calculated given the maximum allowed number of levels $m_{rows}$. This value is calculated by assuming that the number of peers at the first level is $n_1$, the peers at the second level amounts to $n_1 f$, and the number of peers at the third level is $n_1 f^2$, and so on, where f denotes the so called fan-out degree, i.e., the average peer upload capacity in the network, which is calculated as:

$$f = \sum_i \frac{u_i N_i}{N}$$

The sum of the peers arranged in the network having $m_{row}$ distribution levels can thus be calculated as:

$$N = n_1 \sum_{i=1}^{m_{row}} f^i$$

Hence, if the P2P network is to comprise N peers, then the maximum number of peers at the first distribution level row should be:

$$n_1 = \frac{N}{\sum_{i=1}^{m_{row}} f^i}$$

This would advantageously put an upper bound on the number of peers required at the first distribution level, as this is the level to which peers are moved from subsequent level (as has been shown in FIGS. 5-8) when arranging the peers such that $m_{row}$ is not exceeded. This is advantageous, especially in large networks with, say, hundreds of thousands of peers. Instead of starting with a small number of peers at the first level and adding further peers incrementally, the maximum number of peers are placed at the first level.

Once $x_{ij}$ is determined, i.e., the number of peers at level j with bandwidth type i, this can be used to derive a joint probability of distribution level and upload capacity p(u, d) with which the P2P network peers conform by dividing $x_{ij}$ with $\Sigma_i \Sigma_j x_{ij}$, where d would represent the distribution level j and u would represent bandwidth type i.

Figure 9:
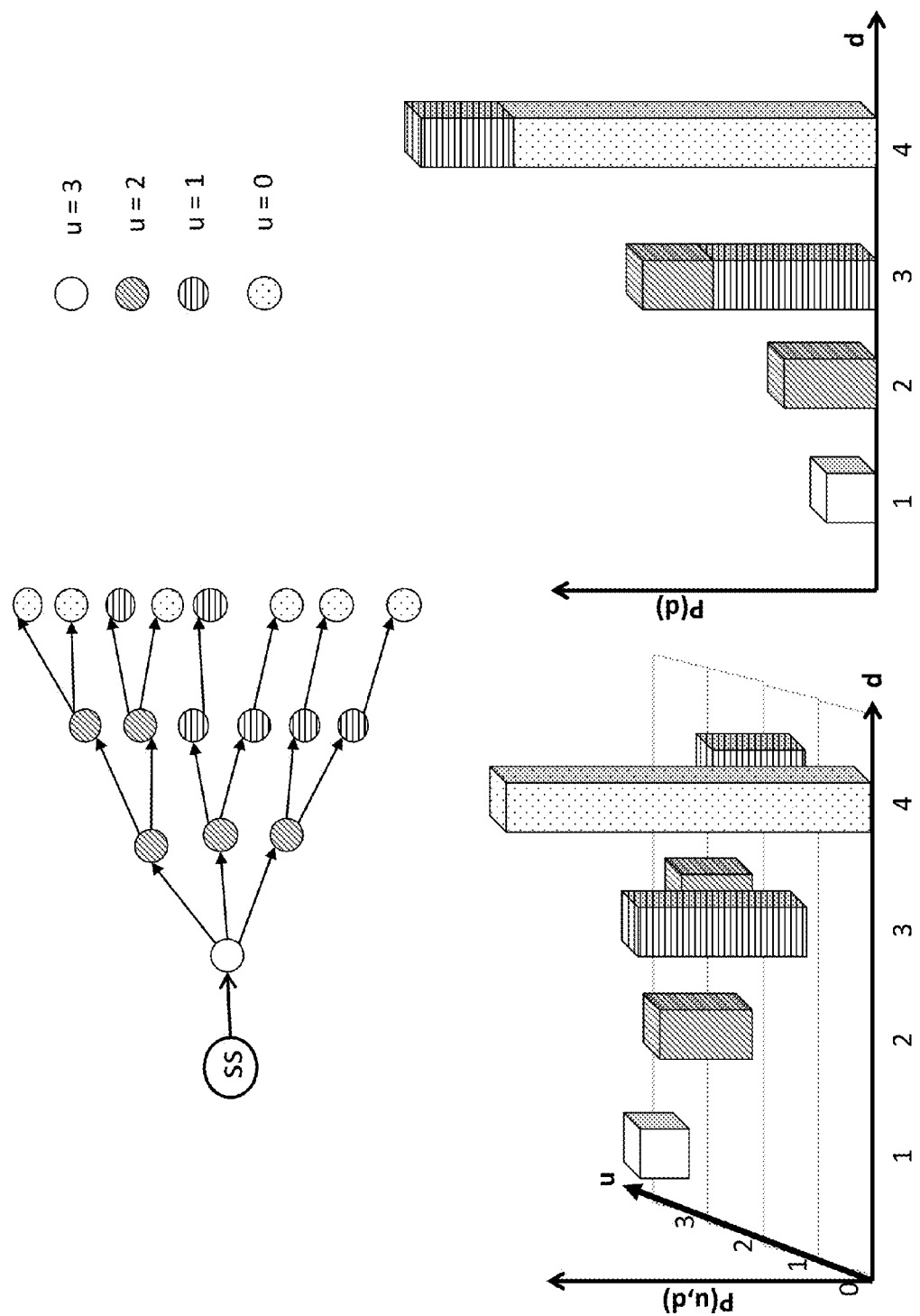
FIG. 9 illustrates joint probability of distribution level and upload capacity.
Figure 12:
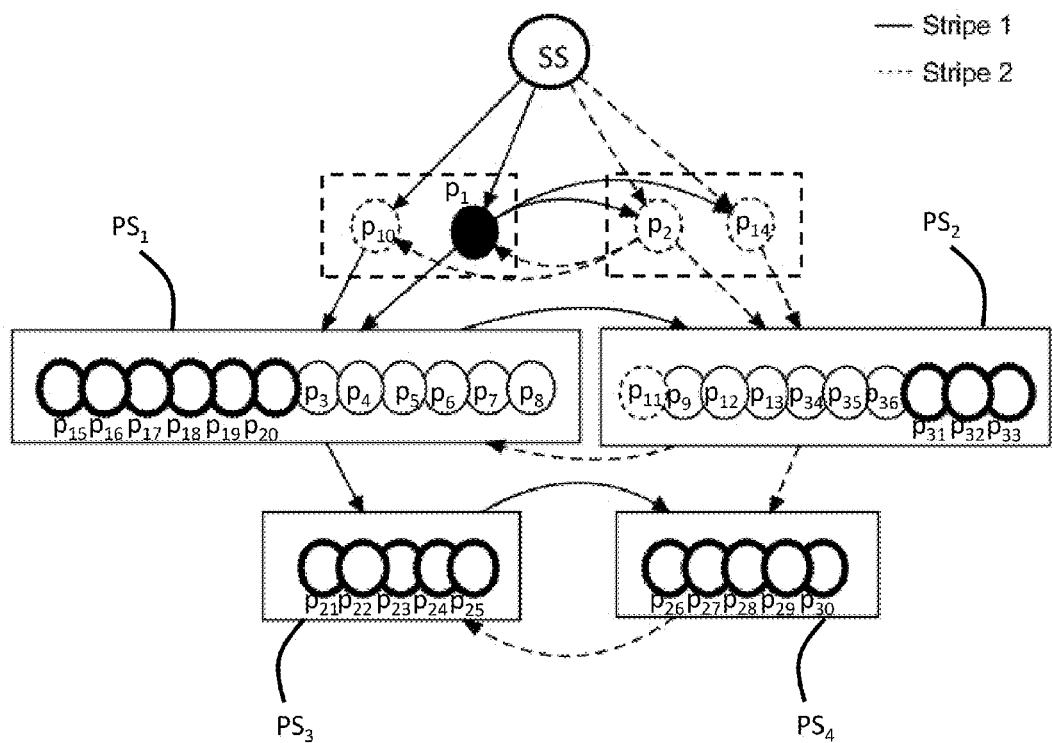
FIG. 12 illustrates a second iteration of the method of arranging peers in a P2P network according to a further embodiment of the present invention shown in FIG. 11.

FIG. 9 illustrates joint probability of distribution level and upload capacity p(u, d). The upper left part of FIG. 12 shows a P2P network where peers are arranged first, second, third and fourth level with respect to a streaming source. Further the peers in the network have an upload capacity from u=0 to u=3. The lower left part of FIG. 9 illustrates the joint probability p(u, d) on the z axis, while the y axis represents the upload capacity and the x axis represents the distribution level of the peers in the P2P network. The lower right part of FIG. 12 shows a discrete version of a p(d) distribution (previously illustrated in FIG. 4) derived from the p(u, d) distribution shown in the lower left part. That is, the p(d) distribution is formed by aggregating probability masses at each distribution level. Analogously, a p(u) distribution could be formed by aggregating the probability masses at each upload capacity measure.

If the distribution level and the upload capacity is modeled as joint probability variables, it is possible to attain even better results in determining distribution level of an entering peer. The probability distribution of distribution level d, with respect to the streaming source is the sum over u of the joint probability p(u, d) as follows:

$$p(d_i) = \sum_u p(u, d_i)$$

Thus, in a further embodiment of the present invention, the joint probability is considered when determining at which distribution level a peer entering the P2P network peer is to be arranged. By having the tracker determine the level at which the peers are to be arranged based on this joint probability, the expected probability of a successful download can be varied accordingly; the more downstream the level, the higher the chance of successful download. However, this will on the other hand imply further delay from the real-time playback point of the content data to be rendered.

This is for example performed by having the tracker sample a conditional probability distribution of level and upload capacity p(d|u) for the network peers. Hence, the tracker gives each joining peer its position in the network in terms of distribution level d from the streaming source based on its upload capacity u according to the conditional distribution $p(d|u)=p(u, d)/p(u)$, i.e. the probability that an entering peer will be arranged at a level d given that it has an upload capacity of u. This is further advantageous in that peers having higher upload capacity can be arranged at a lower level, i.e. be placed closer to the streaming source SS. Thus, the joint distribution $p(u, d)$ is the desired distribution that the P2P network will eventually settle to. To enable this, in an embodiment, each entering peer provides its upload capacity to the tracker.

In a further embodiment of the present invention, in order to improve streaming quality, the peers are arranged such at each peer is only allowed to upload one type of stripe. In this case the system is highly resilient to failures if an error correction algorithm such a Multiple Descriptor Code (MDC) and Forward Error Correction (FEC) is used. If any peer in the network fails when such error correction algorithms are used, peers downloading from this peer will not be affected as they download one stripe only from any peer and hence they can generate the missing stripe from the rest of the stripes until another uploader is found. In order to make each peer upload only one type of stripe, peers at the same distribution level must be allowed to upload to each other. Thus, any peer that is responsible for a given stripe will upload it to peers not responsible for this given stripe at its level as well as peers responsible for this stripe at the immediate subsequent level.

This embodiment of the method of the present invention is illustrated with reference to FIG. 10. For each distribution level $d_i$, the peers are grouped into a number h of sets denoted $\phi(d_i, k)$, where k belongs to $\{1, \ldots, h\}$ for all k. As is understood, h is the number of stripes distributed which forms the piece of data content to be rendered by the peers. In set $\phi(r_i, k)$, peers are responsible for uploading stripe k to the peers at the immediately subsequent level $d_{i+1}$ as well at to those at the same level $d_i$. Consequently, each individual peer set at a certain level is responsible for distributing a certain stripe. The tracker assigns this task to the peers in order for the peers to conform with this constraint.

Subsequently, the tracker effects peer connectivity such that each peer in the set $\phi(d_i, k)$ receives stripe k from the peers $\phi(d_{i-1}, k)$ responsible for that particular stripe at the immediately preceding level and further receives any other stripe k' from peers $\phi(d_i, k')$ responsible for stripe k' at the same level. Hence, each peer in the respective peer set is instructed by the tracker to download one of the stripes from a peer at an immediately preceding distribution level and to download remaining stripes from peers of another peer set arranged at the same level.

As was discussed hereinabove, since peers in the set $\phi(r_i, k)$ are responsible for uploading stripes k to peers at the same level d; as well as to selected peers $\phi(d_{i+1}, k)$ at the immediately subsequent level, the levels in the P2P network are constructed such that the sum of the upload capacity of the peers in set $\phi(r_i, k)$ must be at least equal to $|\phi(r_{i+1}, k)|+ \Sigma_{k',k'\neq k}|\phi(r_{i+1}, k')|$.

Figure 10:
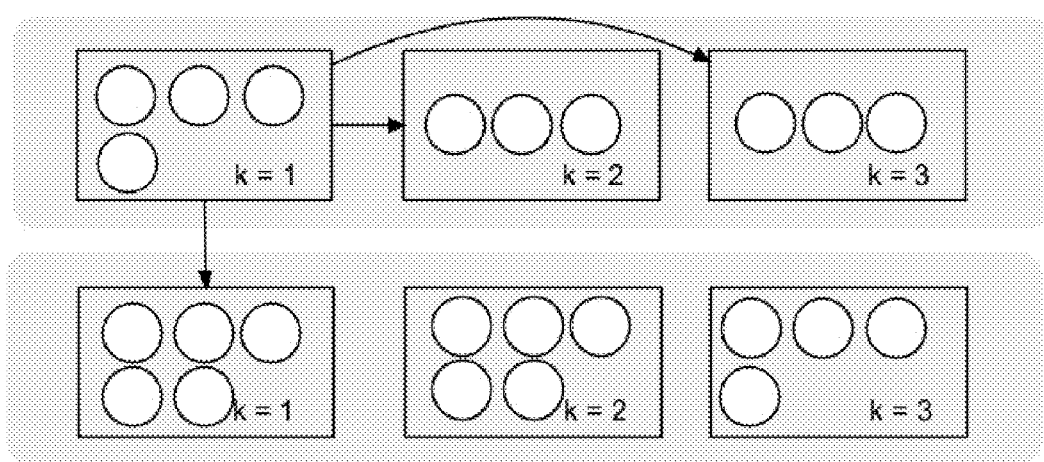
FIG. 10 illustrates a P2P network structure where peers are grouped into peers sets each being responsible for distribution a particular stripe according to an embodiment of the present invention.

With reference to FIG. 10 where h=3, the peers in set $\phi(d_i, 1)$ uploads sub-stream 1 to peers in set $\phi(d_i, 2)$, $\phi(d_i, 3)$ and $\phi(d_{i+1}, 1)$. Further the peers in set $\phi(d_i, 2)$ will upload sub-stream 2 to peers in set $\phi(d_i, 1)$, $\phi(d_i, 3)$ and $\phi(d_{i+1}, 2)$, while the peers in set $\phi(d_i, 3)$ will upload sub-stream 3 to peers in set $\phi(d_i, 1)$, $\phi(d_i, 2)$ and $\phi(d_{i+1}, 3)$.

This embodiment will be described in further detail with reference to FIGS. 10-12. In this particular exemplifying embodiment, the maximal allowed number of distribution levels is $2(m_{row}=2)$.

Figure 11:
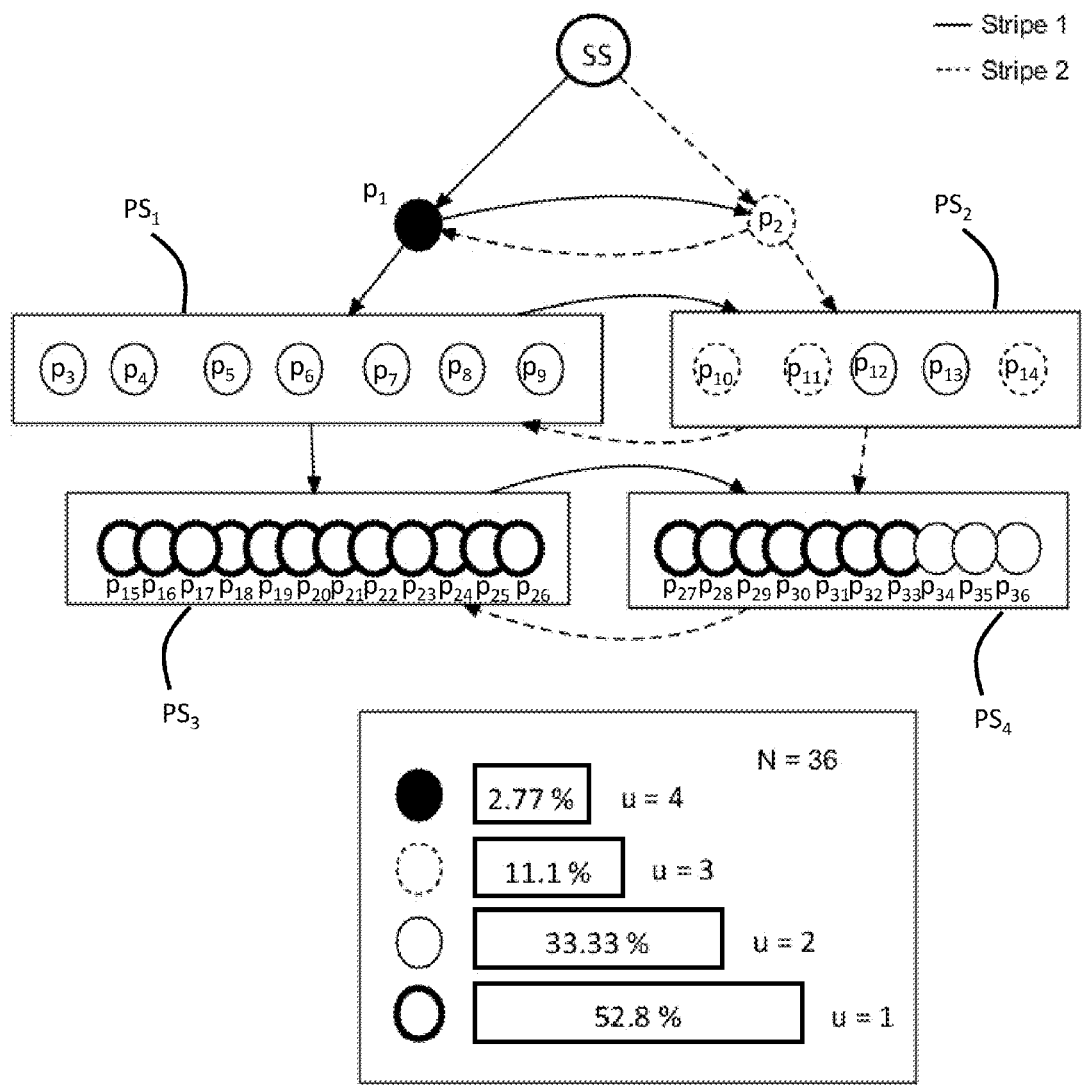
FIG. 11 illustrates a first iteration of a method of arranging peers in a P2P network according to a further embodiment of the present invention.

As can be seen in the exemplifying embodiment of FIG. 11, 36 peers are arranged in a P2P network. Two different types of stripes are distributed by the streaming source: stripe 1 and stripe 2. Unless error correction is implemented, both stripes must typically be uploaded by a peer for rendering a requested piece of content data formed by the stripes.

In a first step, the peer $p_1$, having the highest upload capacity, u=4, is arranged at the distribution level closest to the streaming source SS along with a peer $p_2$ having a next-highest upload capacity, u=3. Should there have been a further peer with u=4, that peer would have been arranged at the first level along with the peer $p_1$, instead of the peer $p_2$. As can be seen, the peer $p_1$ is responsible for distributing stripe 1 only, whereas the peer $p_2$ is responsible for exclusively distributing stripe 2. Thus, the peer $p_1$ distributes stripe 1 to the peer $p_2$ as well as to a first peer set $PS_1$, comprising peers $p_3$-$p_9$ at the immediately subsequent level (which peer set in its turn is responsible for distributing stripe 1 to a second peer set $PS_2$ at the same level and a third peer set $PS_3$ at the next subsequent level). As compared to the exemplifying embodiment illustrated in FIGS. 5-8, an upload capacity of u=4 implies that 8 stripes can be uploaded since each piece of content data is divided into two stripes. The peer $p_2$ distributes stripe 2 to the peer $p_1$, a well as to the second peer set $PS_2$ comprising peers $p_{10}$-$p_{14}$ at the immediately subsequent level. The next-highest capacity peer $p_2$ is capable of uploading 6 stripes. Thus, the upload capacity of the respective peer $p_1$, $p_2$ arranged at the first distribution level is fully utilized. It should be noted that, at least initially, a peer set at the first distribution level may comprise a single peer.

Thereafter, the remaining peers are arranged at subsequent distribution levels in order of descending upload capacity such that each peer has an upload capacity that do not exceed the upload capacity of a peer at an immediately preceding level. Further, the peers are arranged such that the total upload capacity of the peers at any distribution level is equal to or exceeds total download demand of the peers $p_{18}$-$p_{41}$ at the fourth distribution level should not exceed the upload capacity of the $p_6$-$p_{17}$ at the third level. As can be seen in FIG. 11, the maximal number of distribution levels allowed in the network, $m_{row}=2$, is exceeded.

Thus, with reference to FIG. 12, a second iteration is undertaken in that two next-highest upload capacity peers $p_{10}$, $p_{14}$ are moved to the first level where the highest-upload capacity peer $p_1$ initially was placed, which two peers $p_{10}$, $p_{14}$ form peer sets with the peers $p_1$ and $p_2$, respectively (the two peer sets at the first level are indicated by means of a respective dashed box). Moreover, a number of peers $p_{15}$-$p_{20}$ from the third peer set $PS_3$ at a level subsequent to that closest to the streaming source SS is re-arranged and connected to the peer $p_1$ having the highest upload capacity such that the full upload capacity (u=4) of the peer $p_1$ having the highest upload capacity is utilized (as well as that of the peer $p_{10}$ in the same peer set). Further a number of peers $p_{31}$-$p_{36}$ from the fourth peer set $PS_4$ at a level subsequent to that closest to the streaming source SS is re-arranged and connected to the peer $p_2$ having the next-highest upload capacity such that the full upload capacity (u=3) of the peer $p_2$ having the highest upload capacity is utilized (as well as that of the peer $p_{14}$ in the same peer set). Finally, a couple of peers $p_9$ and $p_{26}$ are moved sideways for better utilization of upload capacity. Since the maximum number of allowed levels still is exceeded, a third iteration is undertaken.

Figure 13:
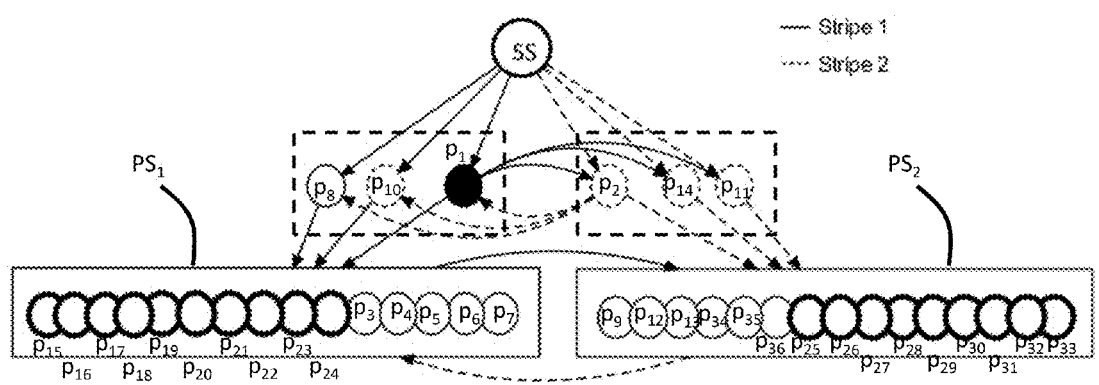
FIG. 13 illustrates a third and final iteration of the method of arranging peers in a P2P network according to a further embodiment of the present invention shown in FIGS. 11 and 12.

With reference to FIG. 13, two next-highest upload capacity peers $p_8$, $p_{11}$ are moved to the first level, which two peers $p_8$, $p_{11}$ form peer sets with the peers $p_1$, $p_{10}$ and $p_2$, $p_{14}$ respectively (the two peer sets at the first level are indicated by means of a respective dashed box). Moreover, a number of peers $p_{21}$-$p_{24}$ from the third peer set $PS_3$ at a level subsequent to that closest to the streaming source SS is re-arranged and connected to the peer set comprising the peer $p_1$ having the highest upload capacity such that the full upload capacity (u=4) of the peer $p_1$ having the highest upload capacity is utilized (as well as that of peers $p_8$ and $p_{10}$ in the same peer set). Further, a number of peers $p_{26}$-$p_{30}$ from the fourth peer set $PS_4$ (and the peer $p_{25}$ from the third peer set $PS_3$) at a level subsequent to that closest to the streaming source SS is re-arranged and connected to the peer $p_2$ having the next-highest upload capacity such that the full upload capacity (u=3) of the peer $p_2$ have the highest upload capacity is utilized (as well as that of the peers $p_{11}$ and $p_{14}$ in the same peer set). As can be seen in FIG. 13, with this third iteration, the maximum number of allowed levels ($m_{row}$=2) is no longer exceeded, and the process terminates. As further peers are added to the P2P network, the process is continuously repeated.

To conclude, given the peer placement described with reference to the various embodiments of the present invention hereinabove, an alternative measure of the savings in the streaming source upload bandwidth can be calculated as the percentage of the peers arranged at the first distribution of all the peers N in the P2P network:

$$\text{savings} = \frac{N_f}{N}$$

where $N_f$ denotes the number of peers at the first level.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of arranging a plurality of peers at distribution levels in a P2P network with respect to a streaming source, the method comprising:
    arranging at least one peer of the plurality of peers having a highest upload capacity at the distribution level closest to the streaming source;
    arranging remaining peers of the plurality of peers at subsequent distribution levels in order of descending upload capacity, such that each peer has an upload capacity that does not exceed the upload capacity of any peer at an immediately preceding level, the peers further being arranged such that the total upload capacity of the peers at any distribution level is equal to or exceeds total download demand of the peers at an immediately subsequent level, and if a predetermined maximal allowed number of distribution levels has been exceeded:
    moving at least one of the peers having a next-highest upload capacity to the distribution level closest to the streaming source and connecting a plurality of peers from subsequent levels to said at least one of the peers having a next-highest upload capacity such that the next-highest upload capacity is fully utilized; and further
    re-arranging at least one selected peer arranged at a level subsequent to that closest to the streaming source and connecting the at least one selected peer to said at least one peer having the highest upload capacity such that the highest upload capacity is fully utilized, until the predetermined maximum number of distribution levels no longer is exceeded.

2. The method of claim 1, wherein the step of moving at least one of the peers having a next-highest upload capacity to the distribution level closest to the streaming source comprises:
    maintaining connection to the peers at the subsequent levels to which said at least one of the peers having a next-highest upload capacity uploads data content, unless the maintaining of the connection results in a peer placed at any level having an upload capacity that exceeds the upload capacity of a peer at an immediately preceding level.

3. The method of claim 1, wherein the step of re-arranging at least one selected peer arranged at a level subsequent to that closest to the streaming source and connecting the at least one selected peer to said at least one peer having the highest upload capacity such that the highest upload capacity is fully utilized comprises:
    maintaining connection to the peers at the subsequent levels to which said at least one selected peer uploads data content, unless the maintaining of the connection results in a peer placed at any level having an upload capacity that exceeds the upload capacity of a peer at an immediately preceding level.

4. The method of claim 1, wherein for each two consecutive distribution levels, a safety factor is set and the peers are arranged such that the total upload capacity of the peers at a first of the two consecutive distribution levels exceeds the total download demand of the peers at the subsequent of the distribution levels by the set safety factor.

5. The method of claim 1, wherein two or more of the plurality of peers having a highest upload capacity is arranged at the distribution level closest to the streaming source.

6. The method of claim 1, wherein two or more of the peers having a next-highest upload capacity is moved to the distribution level closest to the streaming source.

7. The method of claim 1, wherein the streaming source is arranged to divide data content to be streamed into a plurality of content sub-streams together forming the data content and to distribute the plurality of content sub-streams to the plurality peers.

8. The method of claim 7, further comprising:
    grouping the peers into a number of peer sets, each peer set being grouped to comprise peers from the same distribution level and further being arranged to be responsible for distributing a respective content sub-stream; and
    assigning to each peer set a task of distributing said respective content sub-stream to peers or other peer sets arranged in the same distribution layer and to peers arranged in an immediately subsequent distribution layer which further belongs to a peer set being responsible for the distributed respective content substream.

9. The method of claim 1, wherein an upper bound on the number of peers to be arranged at the distribution level closest to the streaming source required for streaming a piece of content data to all network peers is calculated as:

$$n_1 = \frac{N}{\sum_{i=1}^{m_{row}} f^i}$$

where N denotes the total number of peers in the network $m_{row}$ denotes the predetermined maximal allowed number of distribution levels and f denotes the average upload capacity.

10. The method of claim 1, further comprising:
receiving the upload capacity of each of the plurality peers.

11. The method of claim 1, wherein the steps of arranging the peers at the distribution levels comprises:
determining the distribution level at which each of the peers is to be arranged by sampling the determined distribution level from a conditional probability distribution of distribution level and upload capacity for the plurality of peers.

12. The method according to claim 1, further comprising:
estimating streaming source savings as a ratio of the number of peers placed at the distribution level closest to the streaming source to the total number of peers in the network.

13. A device for arranging a plurality of peers at distribution levels in a P2P network with respect to a streaming source, the device comprising a microprocessor unit being configured to:
arrange at least one peer of the plurality of peers having a highest upload capacity at the distribution level closest to the streaming source;
arrange remaining peers of the plurality of peers at subsequent distribution levels in order of descending upload capacity, such that each peer has an upload capacity that does not exceed the upload capacity of any peer at an immediately preceding level, the peers further being arranged such that the total upload capacity of the peers at any distribution level is equal to or exceeds total download demand of the peers at an immediately subsequent level, and if a predetermined maximal allowed number of distribution levels has been exceeded, to:
move at least one of the peers having a next-highest capacity to the distribution level closest to the streaming source and connecting a plurality of peers from subsequent levels to said at least one of the peers having a next-highest upload capacity such that the next-highest upload capacity is fully utilized; and further to
re-arrange at least one selected peer arranged at a level subsequent to that closest to the streaming source and connecting the at least one selected peer to said at least one peer having the highest upload capacity such that the highest upload capacity is fully utilized, until the predetermined maximum number of distribution levels no longer is exceeded.

14. The device of claim 13, the microprocessor unit further being configured to, when moving at least one of the peers having a next-highest upload capacity to the distribution level closest to the streaming source:
maintain connection to the peers at the subsequent levels to which said at least one of the peers having a next-highest upload capacity uploads data content, unless the maintaining of the connection results in a peer placed at any level having an upload capacity that exceeds the upload capacity of a peer at an immediately preceding level.

15. The device of claim 13, the microprocessor unit further being configured to, when re-arranging at least one selected peer arranged at a level subsequent to that closest to the streaming source and connecting the at least one selected peer to said at least one peer having the highest upload capacity such that the highest upload capacity is fully utilized;
maintain connection to the peers at the subsequent levels to which said at least one selected peer uploads data content, unless the maintaining of the connection results in a peer placed at any level having an upload capacity that exceeds the upload capacity of a peer at an immediately preceding level.

16. The device of claim 13, the microprocessor unit further being configured to, for each two consecutive distribution levels, set a safety factor and arrange the peers such that the total upload capacity of the peers at a first of the two consecutive distribution levels exceeds the total download demand of the peers at the subsequent of the distribution levels by the set safety factor.

17. The device of claim 13, the microprocessor unit further being configured to arrange two or more of the plurality of peers having a highest upload capacity at the distribution level closest to the streaming source.

18. The device of claim 13, the microprocessor unit further being configured to move two or more of the peers having a next-highest upload capacity to the distribution level closest to the streaming source.

19. The device of claim 13, wherein the streaming source is arranged to divide data content to be streamed into a plurality of content sub-streams together forming the data content and to distribute the plurality of content sub-streams to the plurality peers.

20. The device of claim 19, the microprocessor unit further being configured to:
group the peers into a number of peer sets, each peer set being grouped to comprise peers from the same distribution level and further being arranged to be responsible for distributing a respective content sub-stream; and
assign to each peer set a task of distributing said respective content sub-stream to peers of other peer sets arranged In the same distribution layer and to peers arranged in an immediately subsequent distribution layer which further belongs to a peer set being responsible for the distributed respective content sub-stream.

21. The device of claim 13, the microprocessor unit further being configured to determine an upper bound on the number of peers to be arranged at the distribution level closest to the streaming source required for streaming a piece of content data to all network peers by calculating:

$$n_1 = \frac{N}{\sum_{i=1}^{m_{row}} f^i}$$

where N denotes the total number of peers in the network $m_{row}$ denotes the predetermined maximal allowed number of distribution levels and f denotes the average upload capacity.

22. The device of claim 13, the microprocessor unit further being configured to:
receive the upload capacity of each of the plurality of peers.

23. The device of claim 13, the microprocessor unit further being configured to:
determine the distribution level at which each of the peers is to be arranged by sampling the determined distribution level from a conditional probability distribution of distribution level and upload capacity for the plurality of peers.

24. The device of claim 13, the microprocessor unit further being configured to:
estimate streaming source savings as a ratio of the number of peers placed at the distribution level closest to the streaming source to the total number of peers in the network.

25. A non-transitory computer readable medium, the computer readable medium having microprocessor-executable instructions stored thereon, which when executed by at least one microprocessor unit, will cause the at least one microprocessor unit to perform a method of arranging a plurality of peers at distribution levels in a P2P network with respect to a streaming source, the method comprising:

arranging at least one peer of the plurality of peers having a highest upload capacity at the distribution level closest to the streaming source;

arranging remaining peers of the plurality of peers at subsequent distribution levels in order of descending upload capacity, such that each peer has an upload capacity that does not exceed the upload capacity of any peer at an immediately preceding level, the peers further being arranged such that the total upload capacity of the peers at any distribution level is equal to or exceeds total download demand of the peers at an immediately subsequent level, and if a predetermined maximal allowed number of distribution levels has been exceeded:

moving at least one of the peers having a next-highest upload capacity to the distribution level closest to the streaming source and connecting a plurality of peers from subsequent levels to said at least one of the peers having a next-highest upload capacity such that the next-highest upload capacity is fully utilized; and further re-arranging at least one selected peer arranged at a level subsequent to that closest to the streaming source and connecting the at least one selected peer to said at least one peer having the highest upload capacity such that the highest upload capacity is fully utilized, until the predetermined maximum number of distribution levels no longer is exceeded.

26. The non-transitory computer readable medium of claim 25, wherein the step of moving at least one of the peers having a next-highest upload capacity to the distribution level closest to the streaming source comprises:

maintaining connection to the peers at the subsequent levels to which said at least one of the peers having a next-highest upload capacity uploads data content, unless the maintaining of the connection results in a peer placed at any level having an upload capacity that exceeds the upload capacity of a peer at an immediately preceding level.

\* \* \* \* \*